(12) United States Patent
Katagishi et al.

(10) Patent No.: US 7,139,533 B2
(45) Date of Patent: Nov. 21, 2006

(54) MOBILE COMMUNICATION TERMINAL

(75) Inventors: Makoto Katagishi, Chigasaki (JP); Taku Takaki, Fujisawa (JP); Yutaka Chiba, Hitachinaka (JP); Masanobu Kumekawa, Hitachinaka (JP); Kazunori Hoshino, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 487 days.

(21) Appl. No.: 10/641,907

(22) Filed: Aug. 15, 2003

(65) Prior Publication Data
US 2004/0063476 A1 Apr. 1, 2004

(30) Foreign Application Priority Data
Sep. 4, 2002 (JP) ............................. 2002-277046
Oct. 31, 2002 (JP) ............................. 2002-316980

(51) Int. Cl.
H04B 1/02 (2006.01)
H04B 7/02 (2006.01)

(52) U.S. Cl. ................. 455/101; 455/276.1; 455/575.3

(58) Field of Classification Search ................ 455/101, 455/132, 137–139, 272–273, 276.1, 550.1, 455/575.3, 575.7; 375/347; 370/342
See application file for complete search history.

(56) References Cited

U.S. PATENT DOCUMENTS

| | | | |
|---|---|---|---|
| 5,949,833 A * | 9/1999 | Weerackody | ............... 375/347 |
| 6,336,037 B1 | 1/2002 | Sekine et al. | |
| 6,771,944 B1 | 8/2004 | Harano | |
| 6,907,263 B1 * | 6/2005 | Ho et al. | ............... 455/552.1 |
| 6,917,337 B1 * | 7/2005 | Iida et al. | ................... 343/702 |
| 2002/0068602 A1 | 6/2002 | Kuriyama et al. | |
| 2002/0094789 A1 | 7/2002 | Harano | |

FOREIGN PATENT DOCUMENTS

| | | |
|---|---|---|
| CN | 1310523 A | 8/2001 |
| JP | 08-125597 A | 5/1996 |
| JP | 11-150496 A | 6/1999 |
| JP | 11-177485 | 7/1999 |
| JP | 11-274966 | 10/1999 |
| JP | 2000-216717 A | 8/2000 |
| JP | 2001-036317 | 2/2001 |
| JP | 2001-326524 A | 11/2001 |
| JP | 2001-358514 A | 12/2001 |
| JP | 2002-094317 A | 3/2002 |
| JP | 2002-135023 A | 5/2002 |
| JP | 2002-171112 A | 6/2002 |
| JP | 2002-171190 | 6/2002 |
| JP | 2002-217803 | 8/2002 |
| JP | 2002-261665 | 9/2002 |
| JP | 2002-314313 | 10/2002 |
| WO | WO 02/084792 | 10/2002 |

* cited by examiner

Primary Examiner—Nguyen T. Vo
(74) Attorney, Agent, or Firm—Townsend and Townsend and Crew LLP

(57) ABSTRACT

Embodiments of the present invention are directed to a mobile communication device that includes a plurality of antennas for receiving signals and is configured to reduce the deterioration of the antennas characteristics. In specific embodiments the mobile device is a folding type mobile communication terminal having the structure that permits easy opening or closing and enabling stabilization of the antenna characteristic. In one embodiment, a mobile communication device comprises a plurality of antennas configured to receive signals; a signal processing circuit configured to combine and process the signals received from the plurality of antennas; and a phase alignment circuit provided for each of the plurality of antennas and configured to subject a phase of a signal received by each of the plurality of antennas to an in-phase adjustment.

19 Claims, 8 Drawing Sheets

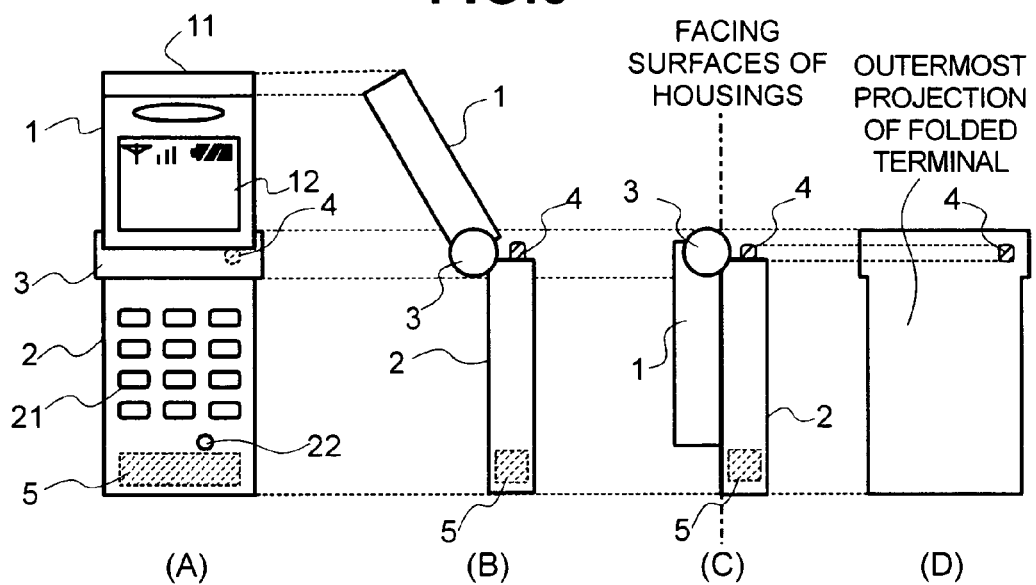
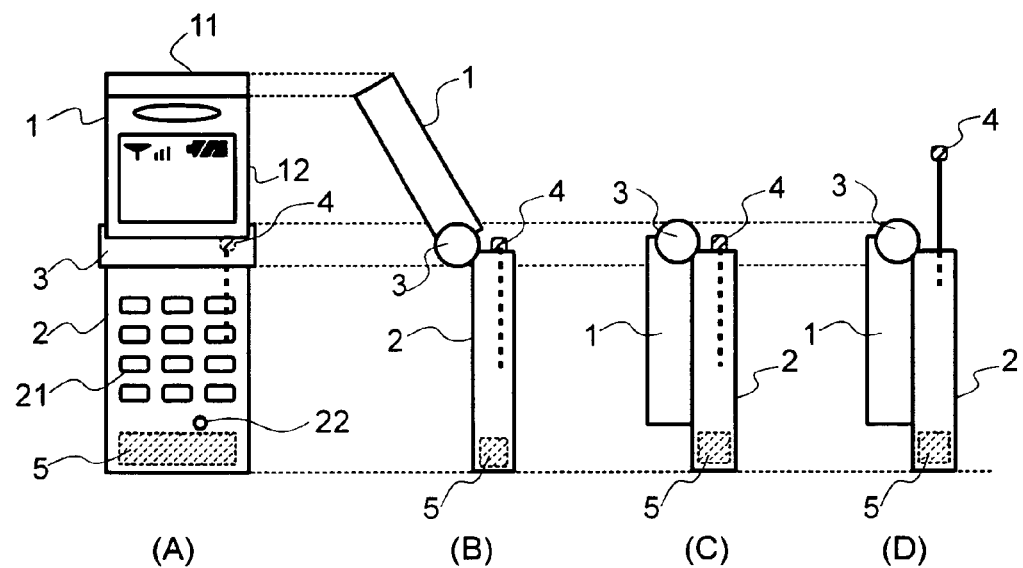

(A)      (B)      (C)

MOBILE COMMUNICATION TERMINAL

CROSS-REFERENCES TO RELATED APPLICATIONS

This application relates to and claims priority from Japanese Patent Application No. 2002-277046, filed on Sep. 24, 2002 and Japanese patent Application No. 2002-316980, filed on Oct. 31, 2002, the entire disclosures of which are incorporated herein by reference.

BACKGROUND OF THE INVENTION

1. Technical Field of the Invention

The present invention relates to a mobile communication terminal having a plurality of antennas, such as a cellular phone or a personal digital assistant (PDA).

2. Related Art

Proposals have been made of a technology for stabilizing the antenna characteristic such as antenna gain or radiation efficiency irrespective of whether a terminal is held in a hand, put into a pocket, or the like (see, e.g., Japanese Unexamined Patent Application Publication No. 11-274966). The above publication describes the use of an embedded antenna in addition to a rod-like antenna in order to stabilize the antenna characteristic. Consequently, even when a user holds a mobile communication terminal in his/her left or right hand while transmitting speech by radio, the rod-like antenna and embedded antenna can be automatically switched based on a state of reception at a radio frequency.

When a plurality of antennas are included, the antennas may interact with each other. Consideration must therefore be taken into the arrangement of the antennas. In particular, when it comes to a folding type mobile communication terminal, the positional relationship between antennas varies depending on whether the terminal is closed (folded) or opened (unfolded). It therefore affects the antenna characteristic how a plurality of antennas are arranged. However, the related art does not reveal anything about a constituent feature suitable for a mobile communication terminal shaped to be able to be folded.

The prior mobile phones are configured such that a linear antenna comprising a whip antenna and an antenna top portion which incorporates a helical antenna as connected through an insulating spacer to the tip end of the whip antenna, is mounted in the casing. The pull-up of the top portion causes the whip antenna to be pulled out of the casing so as to receive phone radio waves through the whip antenna while the pull-in of the top portion causes the whip antenna to be stored in the casing, thereby enabling the helical antenna to be available for use in receiving the radio waves.

In order to keep the antenna characteristics as required for receiving phone radio waves through such linear antenna as mentioned above, the outline of the linear antenna, i.e. the size of the antenna top portion and the thickness and the length of the whip antenna, tends to be enlarged, suffering from difficulties in producing a more compact casing.

JP-A No. 36317/2001 discloses that the linear antenna and the surface mounting antenna are adjacently disposed, which linear antenna is excited by the power supplied to the power supply electrode of the surface mounting antenna. The mobile phone by concurrent use of two antennas as disclosed therein is simple in structure and provides enhanced antenna characteristics. Thus, the mobile phone can render its linear antenna smaller in size than the other prior mobile phones. However, because the linear antenna and the surface mounting antenna are adjacently disposed, upon storing the linear antenna as contracted into the casing, its top portion and casing portion to cover the surface mounting antenna might be wrapped by a user's hand, suffering from the deterioration of the antennas characteristics as required.

SUMMARY OF THE INVENTION

Embodiments of the present invention are directed to a mobile communication device such as a mobile terminal or a mobile phone that includes a plurality of antennas for receiving signals and is configured to reduce the deterioration of the antennas characteristics. In specific embodiments the mobile device is a folding type mobile communication terminal having the structure that permits easy opening or closing and enabling stabilization of the antenna characteristic.

In accordance with an aspect of the present invention, a mobile communication device comprises a plurality of antennas configured to receive signals; a signal processing circuit configured to combine and process the signals received from the plurality of antennas; and a phase alignment circuit provided for each of the plurality of antennas and configured to subject a phase of a signal received by each of the plurality of antennas to an in-phase adjustment.

In some embodiments, the signal processing circuit comprises a CDMA signal processing circuit. The signals received by the plurality of antennas are connected through the coupling portion to a radio circuit. The coupling portion includes a pair of lands and is configured such that the signal received by a first antenna of the plurality of antennas is transmitted directly to the radio circuit and the signal received by a second antenna of the plurality of antennas is transmitted to the radio circuit through the pair of lands so as to weaken a degree of coupling between the signal received by the first antenna and the radio circuit at the pair of lands.

In specific embodiments, the first antenna comprises a whip antenna, and an antenna top portion connected through an insulating spacer to a tip end of the whip antenna and including a helical antenna, and the second antenna comprises a surface mounted antenna. The first antenna and the second antenna have extension lines that are oriented crosswise with respect to one another.

In some embodiments, a housing includes a first housing portion and a second housing portion rotatably connected by a pivotable connection to permit folding of the first and second housing portions in a folded position. The first housing portion includes a first end surface disposed opposite from the pivotable connection and the second housing portion includes a second end surface disposed opposite from the pivotable connection. The first end surface and the second end surface are misaligned with respect to one another in the folded position of the first and second housing portions; and the first end surface extends past the second end surface from the pivotable connection and is not superposed by the second housing portion. At least one of the plurality of antennas is disposed near the pivotable connection, and at least another one of the plurality of antennas is disposed near the first end surface. The antenna disposed near the first end surface is disposed at a location which is not superposed by the second housing portion in the folded position. The antenna disposed near the pivotable connection is movable between a stowed position in one of the first and second housing portions which is an antenna housing and an extended position. The antenna in the stowed position is disposed so as not to extend beyond the pivotable connection with the first and second housing portions in the folded position.

In accordance with another aspect of the invention, a mobile communication device comprises a plurality of antennas configured to receive signals; a CDMA circuit configured to process the signals received from the plurality of antennas; and a phase alignment circuit provided for each of the plurality of antennas and configured to subject a phase of a signal received by each of the plurality of antennas to an in-phase adjustment.

In accordance with yet another aspect of this invention, a mobile communication method comprises receiving signals using a plurality of antennas; adjusting a phase of a signal received by one of the plurality of antennas; and combining the signals received by the plurality of antennas.

BRIEF DESCRIPTION OF THE DRAWINGS

FIG. 3 shows a mobile communication terminal according to a second embodiment.

FIG. 4 shows a mobile communication terminal according to a third embodiment.

DETAILED DESCRIPTION OF THE INVENTION

Embodiments of the present invention will be described in conjunction with the drawings. The embodiments will be described by taking for instance a folding type cellular phone as a mobile communication terminal.

Figure 1:
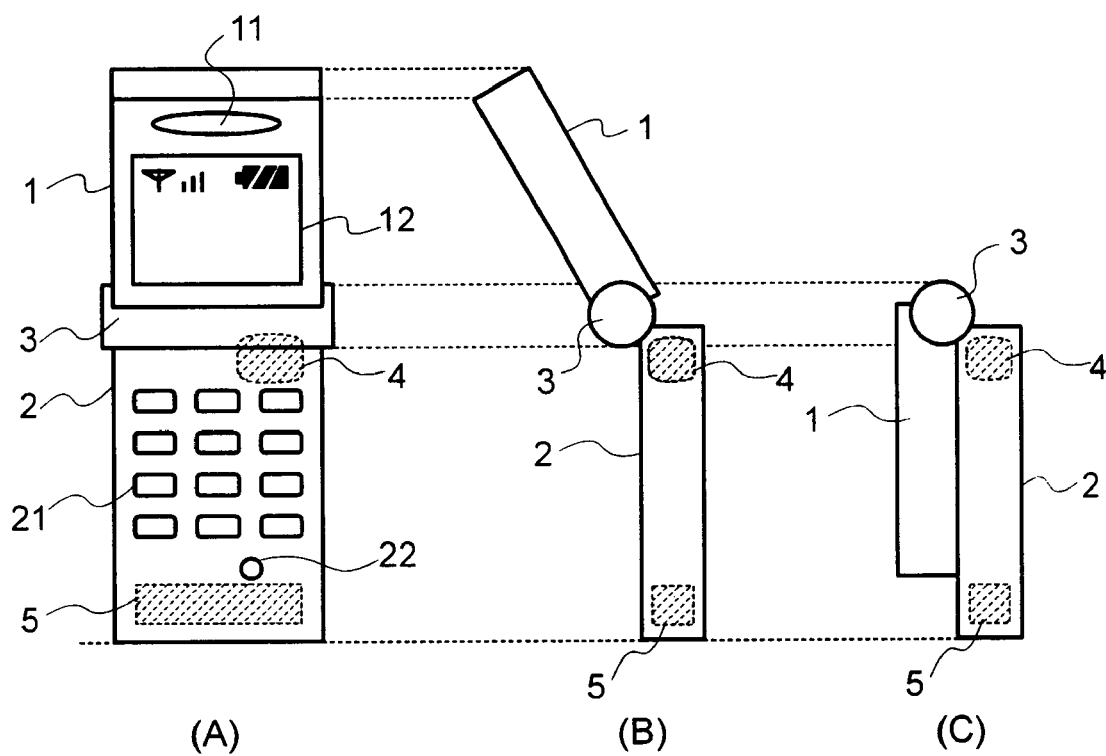
FIG. 1 shows a mobile communication terminal according to a first embodiment.

FIG. 1 shows the construction of a mobile communication terminal in accordance with a first embodiment of the present invention. The terminal includes a first housing 1 and a second housing 2. The housings are joined by a hinge 3 so that they can pivot on the hinge. The first housing 1 includes an ear receiver 11 that transmits an audio signal and a display unit 12 on which a communicating situation or the contents of communication are displayed. The second housing 2 includes an operating unit 21 used to enter information that is received by the terminal, and a microphone 22 through which an audio signal is received.

To begin with, the positional relationship between the housings will be described. FIG. 1(A) is a front view of the terminal that is to be operated. FIG. 1(B) is a side view of the terminal, and FIG. 1(C) is a side view of the terminal being folded. As apparent from FIG. 1(C), the end surfaces of the housings included in the present embodiment are nearly parallel to the axis of rotation of the hinge and are misaligned with each other so that the positions thereof will not be flush with each other with the terminal folded. Consequently, when the housings are opened or closed, force can be efficiently applied to one of the housings. This leads to improved maneuverability.

Next, the positional relationship between antennas will be described. The housing 2 has, as shown in FIG. 1, a first antenna 4 and a second antenna 5. The first antenna 4 is located near the hinge 3, while the second antenna 5 is located on the side of the housing opposite to the side thereof adjoining the hinge 3. The plurality of antennas are thus located near opposite edges of the housing 2. Therefore, even when a user holds the terminal, the probability that all the antennas are blocked can be minimized and the antenna characteristic such as antenna gain or radiation efficiency can be stabilized. Moreover, since the plurality of antennas are included in one of the housings, the relative positional relationship between the antennas is fixed irrespective of whether the housings are opened or closed. Consequently, the antenna characteristic is stabilized. Moreover, the antenna 5 is located near a region of the second housing 2 in which part or the whole of the antenna 5 will not be opposed to (i.e., will not overlap with) the first housing 1 with the cellular phone folded so that the antenna 5 will not be hid behind the housing 1. Consequently, blocking of radio waves by the mutually opposed housings in the folded position can be avoided. The antenna characteristic can remain satisfactory with the terminal folded. According to the present embodiment, the antennas are included in the second housing 2. When the same applies to the first housing 1 instead of the second housing 2, the same advantage is provided.

Figure 2:
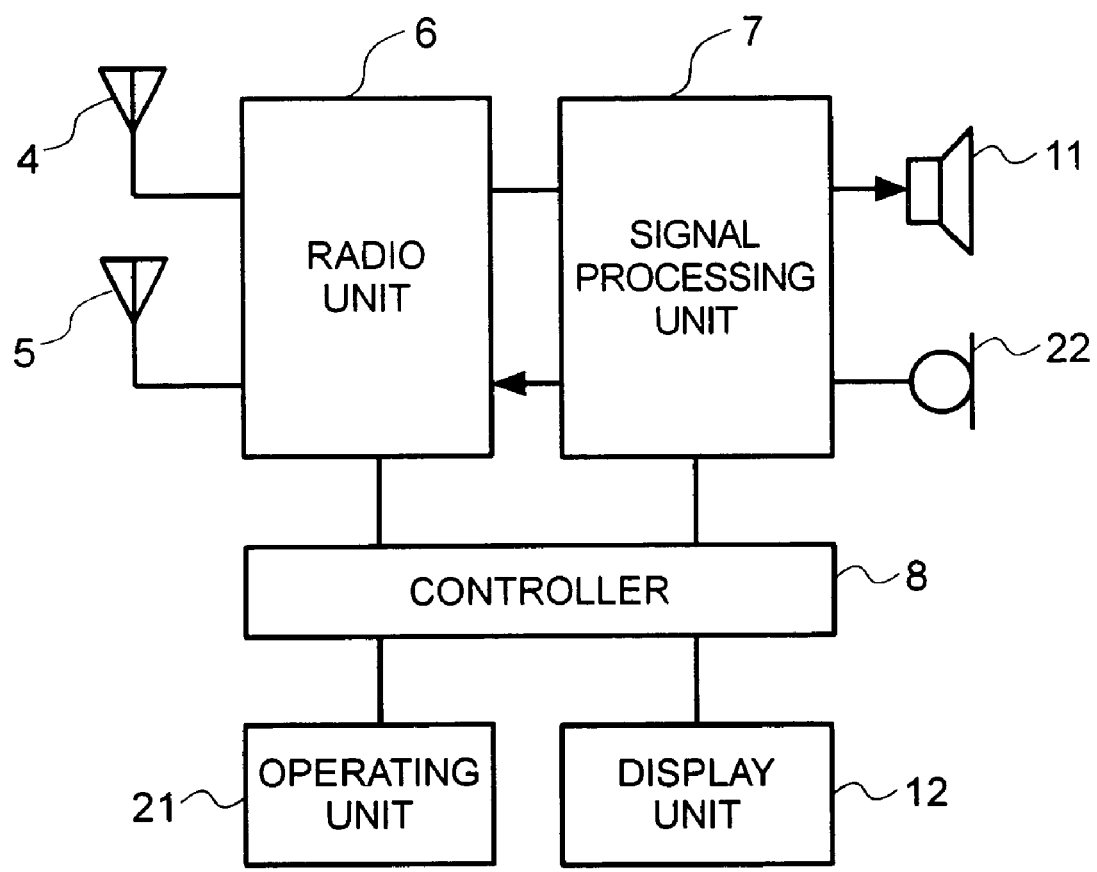
FIG. 2 is a functional block diagram showing an example of the internal circuitry of the first embodiment.

FIG. 2 shows the relationships among the antennas and the internal circuitry of the mobile communication terminal. The antennas 4 and 5 are connected to a radio unit 6 that receives or transmits a radio-frequency signal. The radio unit 6 is connected to a signal processing unit 7. The signal processing unit 7 converts a received signal into an audio signal or data or converts a received audio signal or data into a transmission signal. An audio signal produced by the signal processing unit 7 is transmitted through the ear receiver 11. An audio signal received through the microphone 22 is converted into a transmission signal by the signal processing unit 7. The controller 8 controls the radio unit 6 and signal processing unit 7. A manipulation performed by a terminal user or an instruction entered thereby is received through the operating unit 21, whereby the controller 8 performed desired processing. The controller 8 controls a state of communication or the contents thereof so that it will be displayed on the display unit 12. These components are not limited to the cellular phone but can be adapted to a communication terminal having a communicating facility. Moreover, the capabilities of the radio unit 6 and signal processing unit 7 are not limited to a specific communication method.

FIG. 3 shows the construction of a mobile communication terminal in accordance with a second embodiment of the present invention. The present embodiment is constructed so that the antenna 4 corresponding to the one included in the first embodiment will jut out of the second housing 2. The antenna 4 is located near the hinge 3 so that it will jut out of the housing. Consequently, the position of the antenna 4 is separated from the second housing 2. Performance including antenna directivity is improved. Moreover, the jut of the antenna 4 lies within a range defined by an outermost projection that is formed by projecting the housings, which are closed when the terminal is folded, on a plane opposed to the housings. In other words, in the case of the terminal shown in FIG. 3, the antenna 4 is held in the housing so that it will not overtop (i.e., extend beyond) the hinge 3. Consequently, the incident that the antenna 4 is caught or entangled when the terminal is put in a bag or the like can be prevented. This leads to improved portability. Moreover, since the jut is limited, the terminal is sophisticated in terms of the design.

FIG. 4 shows the construction of a mobile communication terminal in accordance with a third embodiment of the present invention. According to the present embodiment, the antenna 4 is substantially identical to the one included in the second embodiment with the additional feature that it can be pulled out of the second housing 2. Since the antenna 4 can be pulled out, the antenna can be jutted out to tower over the housing if necessary. Consequently, the antenna characteristic can be further improved. Moreover, when the antenna 4 is stowed in the housing 2, the antenna 4 lies, similarly to the one included in the second embodiment, within a range defined by an outermost projection formed by projecting beyond the housings perpendicularly on a plane, which is opposed to the housings, when the terminal is folded. Consequently, the incident that the antenna may be caught or entangled when the terminal is put in a bag or the like can be prevented. Eventually, the portability improves. Moreover, since the jut is limited, the terminal is sophisticated in terms of the design.

Figure 5:
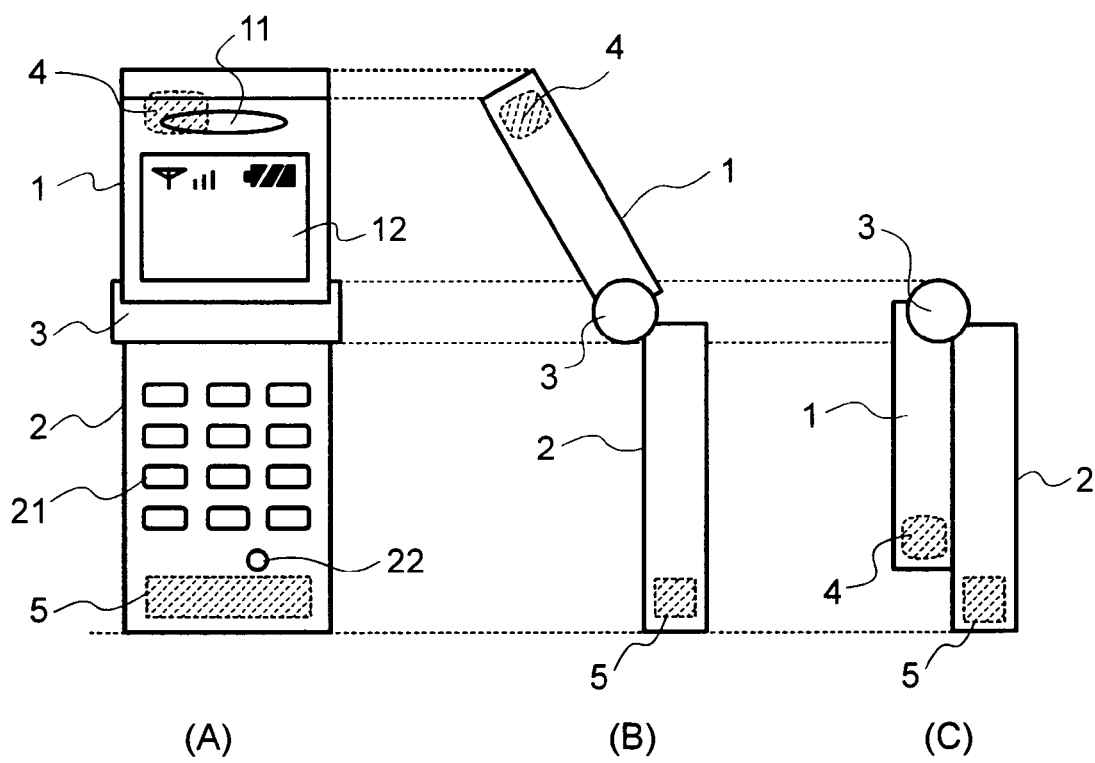
FIG. 5 shows a mobile communication terminal according to a fourth embodiment.

FIG. 5 shows the construction of a mobile communication terminal in accordance with a fourth embodiment of the present invention. According to the foregoing embodiments, the antennas are provided in one of the housings. According to the present embodiment, the antennas are included in the respective housings. As shown in FIG. 5, the antenna 4 is provided in the first housing 1 having the display unit 12, while the antenna 5 is provided in the second housing 2. Since the antennas are thus included in the respective housings, especially when a user operates the terminal while looking at the screen, the positions of the antennas are separated from each other. This suppresses interaction between the antennas and improves the antenna characteristic.

In particular, when the antennas are, as shown in FIG. 5(B), located near the end surfaces of the housings on the sides of the housings opposite to the sides thereof adjoining the hinge 3, as long as the mobile communication terminal is opened for use, the antenna characteristic improves. However, in this case, when the mobile communication terminal is folded, the positions of the antennas 4 and 5 are close to each other unlike the situation when the terminal is opened. This poses a problem that the antennas may interact with each other or that one of the antennas absorbs radio waves. The present invention can minimize the interaction by placing the planes of polarization of the antennas orthogonally to each other. Moreover, the antennas 4 and 5 are positioned so that when the mobile communication terminal is folded, as shown in FIG. 5(C), they will not be superposed on each other. Thus, absorption of radio waves can be prevented or reduced and the antenna characteristic can be improved.

In some cases, the antenna 4 is configured to receive signals from satellites accommodated by a global positioning system (GPS). In general, when the capability of the GPS is utilized, a user operates the terminal while looking at the screen. Therefore, if the antennas are included in the housing 1 that is separated from a human body so that the human body does not block or shield radio waves from the satellites, the antenna characteristic improves.

In the aforesaid embodiments, as shown in FIG. 1 or the like, the housings 1 and 2 are joined using the hinge 3 separately. Alternatively, the housings 1 and 2 may include hinge structures as respective integral parts. The housings are then assembled, whereby a hinge may be constructed. In this case, the number of parts decreases. As a result, the cost of assembling and the time required for the assembling can be suppressed. In still other embodiments, the hinge may be replaced by other rotational connections.

As described above, according to the present embodiment, when the folding type mobile communication terminal is folded, the housings are misaligned with each other. The housings are therefore more easily opened or closed. In addition, two or more antennas are included in one of the housings. One of the antennas is located near a hinge, and the other antenna is located on the side of the housing opposite to the side thereof adjoining the hinge. Consequently, even when a user holds the terminal, the probability that all the antennas are blocked is minimized, and the antenna characteristic can be stabilized.

Moreover, the antenna located on the side of the housing opposite to the side thereof adjoining the hinge is located in a region of the housing that is not opposed to any housing with the terminal folded. Thus, blocking of the antenna by the opposed housing is avoided, and the antenna characteristic is kept satisfactory when the terminal is folded. Moreover, when the antenna located near the hinge is jutted out of the housing, since the position of the antenna is separated from the housing, antenna directivity is innovated. Thus, the antenna characteristic is improved. Furthermore, if the antenna located near the hinge can be pulled out, the antenna characteristic is further improved. When the antenna located near the hinge lies within a range defined by an outermost projection formed by projecting beyond the housings perpendicularly on a plane, which is opposed to the housing, with the terminal folded. This leads to improved portability and a sophisticated design.

Figure 6:
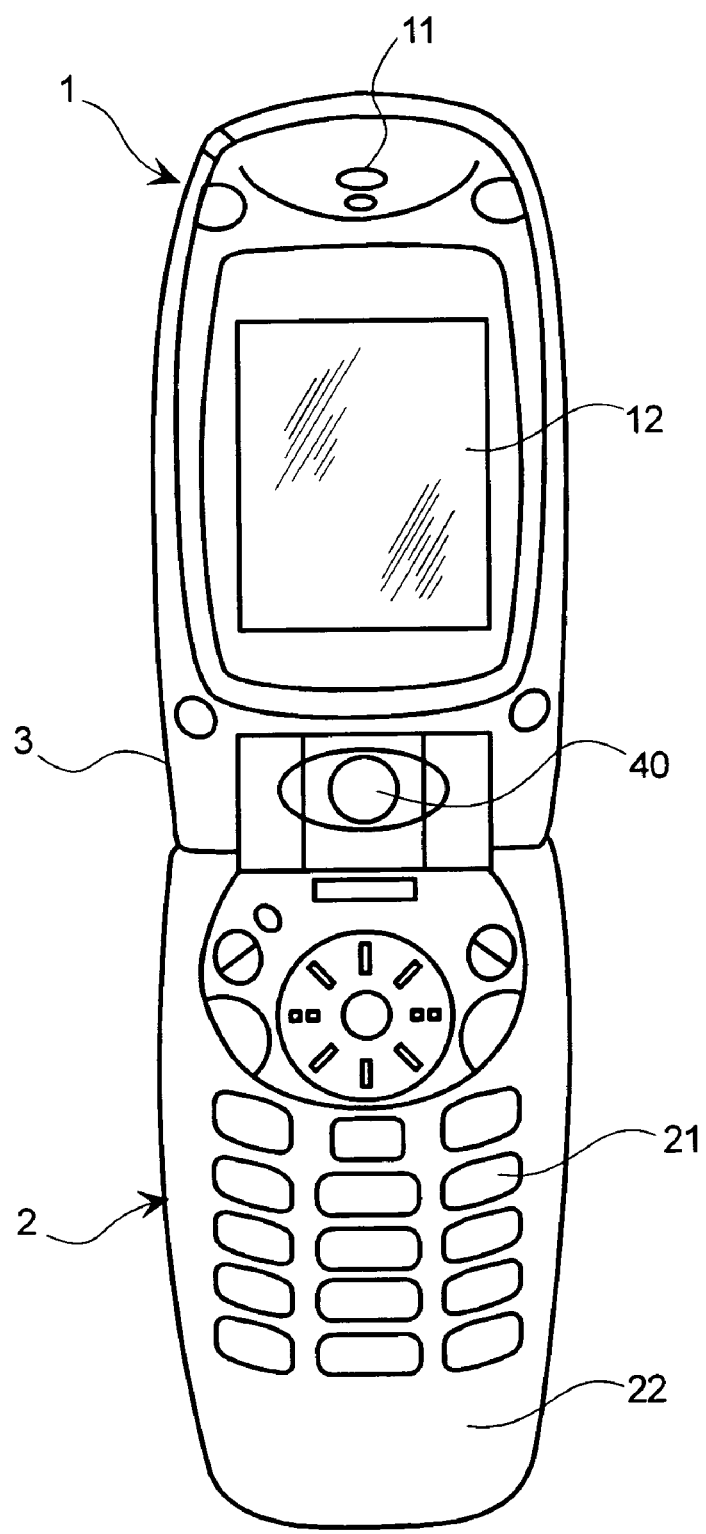
FIG. 6 is a plan view of a mobile phone according to another embodiment of the present invention.

FIG. 6 is a plan view of a mobile phone according to another embodiment, which is a foldable phone that comprises: an upper case 1 provided with a receiver unit 11 and a display unit 12 such as a liquid crystal display unit; a lower case 2 provided with an operation unit 21 and a microphone unit 22; and a hinge portion 3 to foldably connect the upper and lower cases 1 and 2 at their edge portions, at which hinge portion 3 a camera unit 40 is provided. FIG. 6 shows the receiver unit 11 and the liquid crystal display portion 12 with the upper case 1 opened. This opened state allows one user to communicate with the other user through the manipulation of the operation unit 21 which may be a key operation unit.

Figure 7:
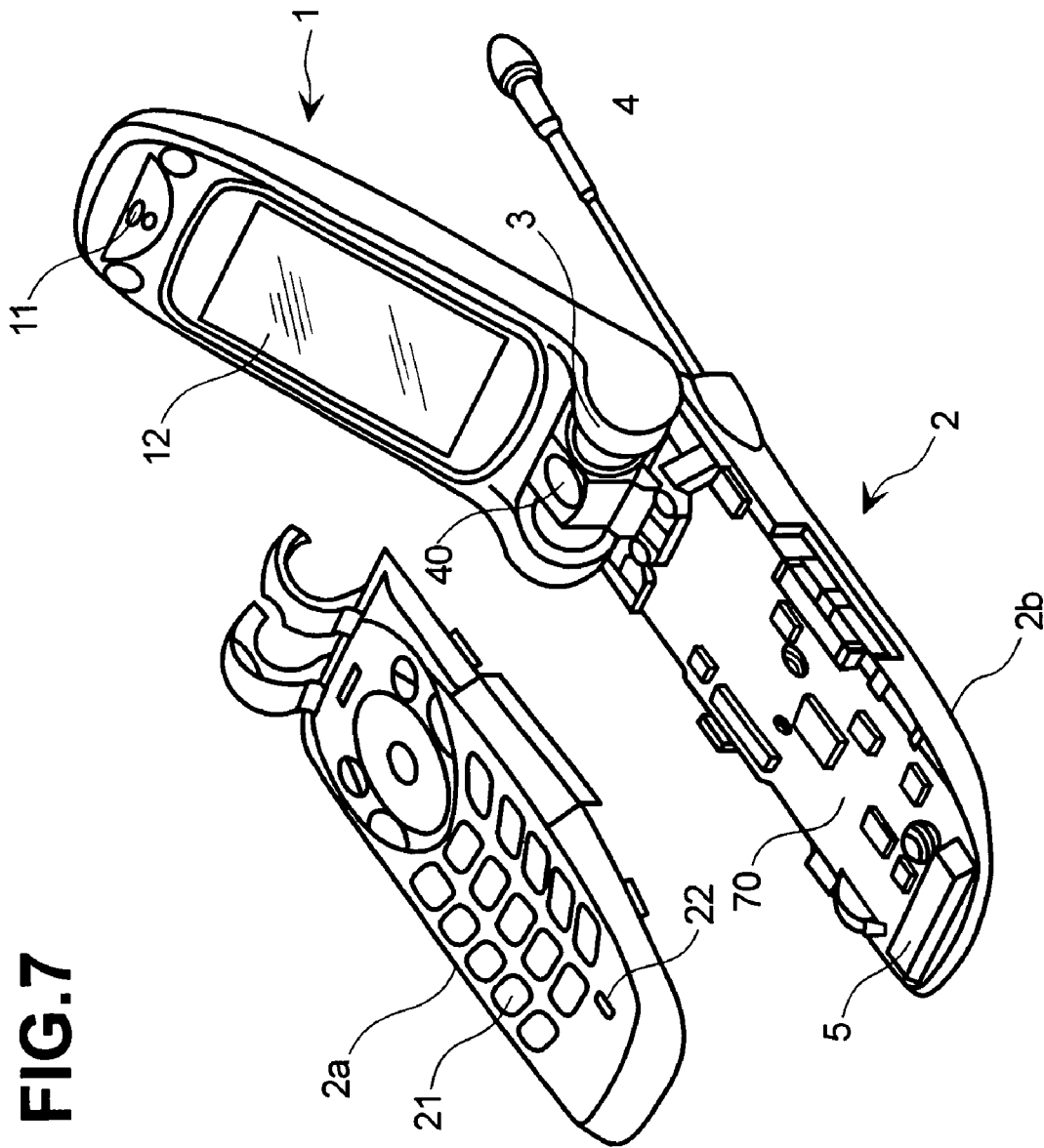
FIG. 7 is a broken perspective view of the mobile phone of FIG. 6 showing the interior of the lower case mounted in the rear cover portion thereof with the front cover portion thereof removed.

FIG. 7 is an exploded perspective view to show the interior of a rear cover portion 2b of the lower case 2 with a front cover portion 2a of the lower case 2 in FIG. 6 removed, and to show a circuit substrate mounted to the rear cover portion 2b. As shown in FIG. 7, a linear antenna 4 is mounted in the vicinity of the hinge portion 3 provided at the lower case 2 and is pulled out of the rear cover portion 2b of the lower case 2. A surface mounted antenna 5 is disposed in the vicinity of a microphone unit 22 and is mounted on the circuit substrate 70. On the substrate 70, various kinds of circuit elements to receive and transmit phone radio waves are mounted.

Figure 8:
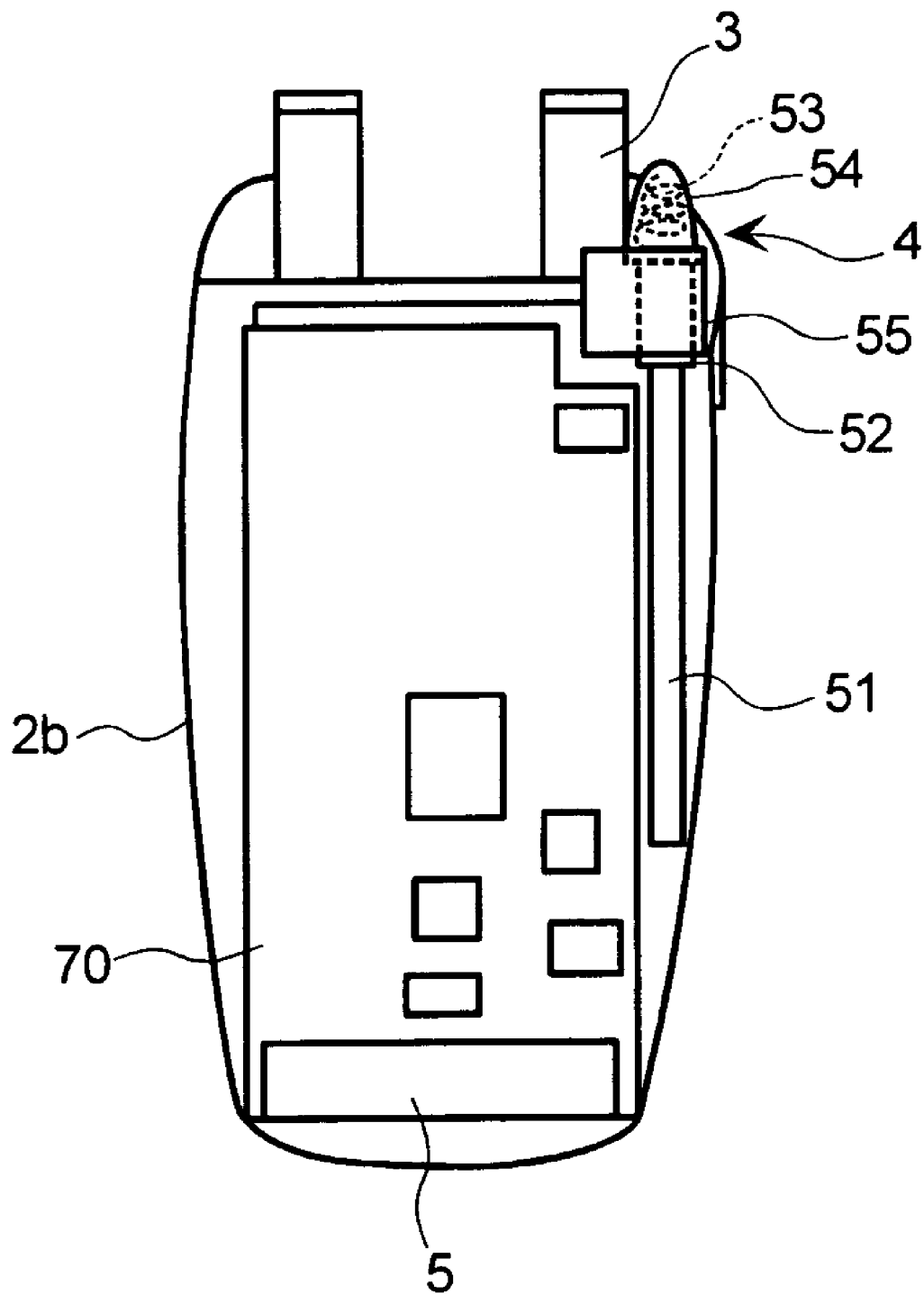
FIG. 8 is a plan view of the mobile phone of FIG. 6 showing the interior of the lower case mounted in the rear cover portion thereof.

FIG. 8 is a plan view to show the interior of the lower case mounted in its rear cover portion 2b. The linear antenna 4 is provided with a whip antenna 51 and an antenna top portion 54 incorporating a helical antenna 53 connected through an insulating spacer 52 to the tip end of the whip antenna 51.

The linear antenna 4 is mounted in the rear cover portion 2b of the lower case with a metallic piece 55 such that it is disposed vertically with regard to the drawing in the vicinity of the hinge portion 3. The surface mounted antenna 5 is mounted on the circuit substrate 70 such that it is disposed transversely with regard to the drawing the vicinity of the microphone unit 22. Accordingly, the linear antenna 4 and the surface mounted antenna 5 are mounted in such positions that extension lines of those antennas run crosswise with respect to one another.

Figure 9:
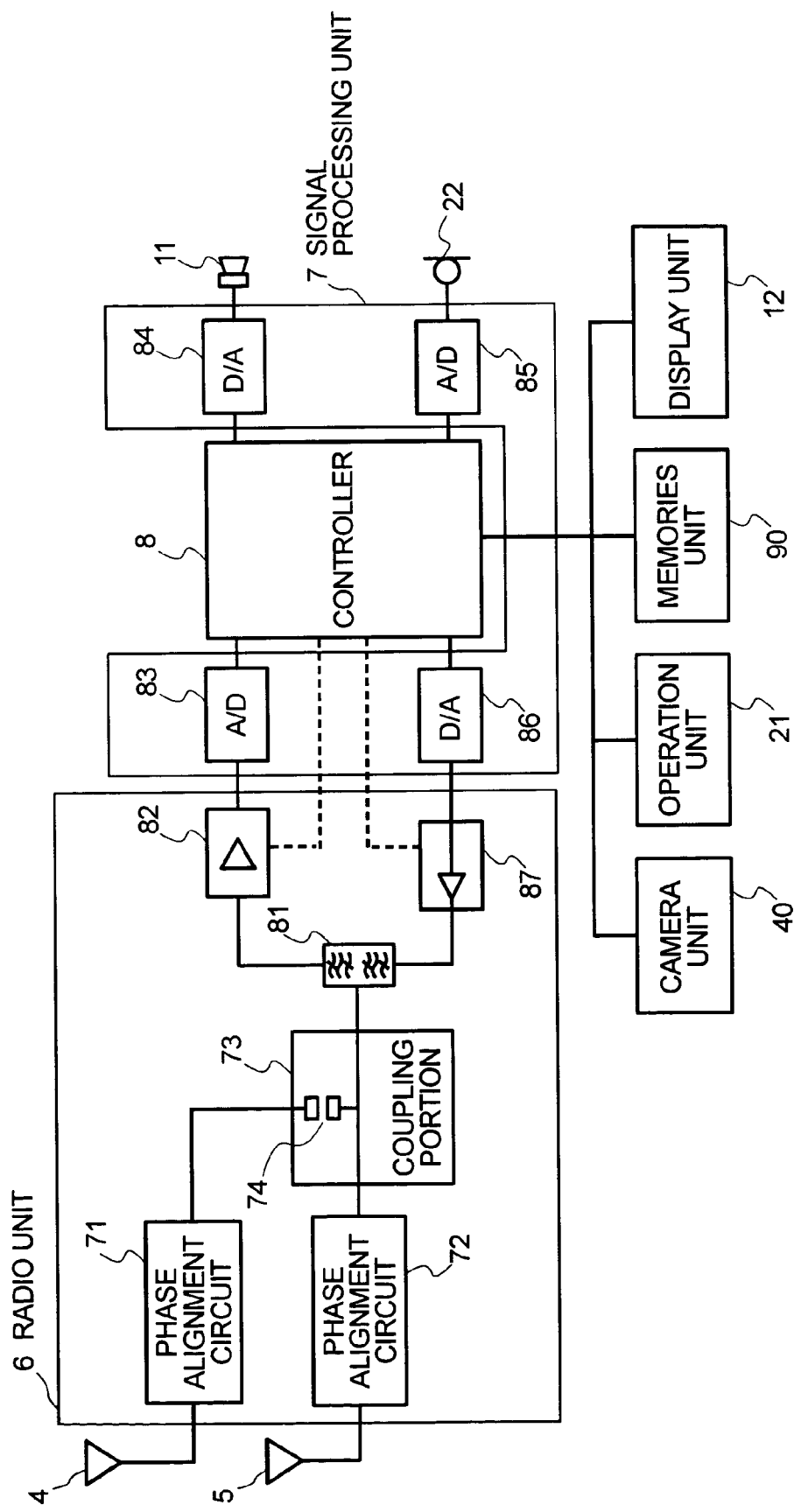
FIG. 9 shows the circuit arrangement of a mobile phone according to an embodiment of the invention.

FIG. 9 shows the circuit arrangement embodied in the mobile phone according to the invention. The signal output from the linear antenna 4 is connected to a phase alignment circuit 71 and the signal output from the surface mounted antenna 5 is connected to a phase alignment circuit 72. The signals output from the phase alignment circuits 71 and 72 are connected to a coupling portion 73. The signals output from the coupling portion 73 is directed to a duplexer 81, which is in turn connected to a receiving circuit 82 and a transmitting circuit 87. The radio unit 6 comprises the phase alignment circuits 71, 72, the coupling portion 73, the pair of lands 74, the duplexer 81, the receiving circuit 82, and the transmitting circuit 87. A signal processing unit 7 comprises an A/D conversion circuit 83, a D/A conversion circuit 84, an A/D conversion circuit 85, and a D/A conversion circuit 86. The D/A conversion circuit 84 is connected to the receiver unit 11, while the A/D conversion circuit 85 is connected to the microphone unit 22. The A/D conversion circuit 83, D/A conversion circuit 84, A/D conversion circuit 85, and D/A conversion circuit 86 are coupled to a controller 8, which may be a CDMA signal processing controller. In addition, a camera unit 40, an operation unit 21, a memories unit 90, and a display unit 12 are connected to the controller 8. The surface mounted antenna 5, the radio unit 6, the signal processing unit 7, the controller 8, and the memories unit 90 are mounted as circuit elements on the substrate 70 shown in FIGS. 7 and 8.

The phase alignment circuits 71 and 72 each act to subject the phase of the signal received by the linear antenna 4 and the surface mounting antenna 5 respectively to an in-phase adjustment. The present embodiment discloses two alignment circuits 71 and 72, but only one adjustment circuit may be provided instead.

At the coupling portion 73, the signal received by the surface mounted antenna 5 is directly transmitted to the duplexer 81 while the signal received by the linear antenna 4 is transmitted to the duplexer 81 through a pair of lands 74 so as to weaken the degree of coupling between the signal received by the linear antenna 4 and the duplexer 81 at such pair of lands 74. The degree of coupling between them may be further weakened by widening an interval between the pair of lands 74.

Upon receiving phone radio waves through the operation unit 21, the signal as received is sent via the duplexer 81 to the receiving circuit 82 and is converted into the digitalized signal at the subsequent A/D conversion circuit 83, which digitalized signal is subjected to the digitalization process at the subsequent CDMA signal processing controller 8, and then is converted into the analog signal at the subsequent D/A conversion circuit 84 so as to be output from the receiver unit 11.

Upon transmitting phone radio waves through the operation unit 21, the speech signals voice-inputted in the microphone unit 22 are converted into the digitalized signals at the A/D conversion circuit 85, which signals are subjected to the digitalization process at the subsequent CDMA signal processing and controller 8, and then is converted into the analog signals at the subsequent D/A conversion circuit 86. The analog signals are amplified at the subsequent transmitting circuit 87 so as to be sent via the duplexer 81 to the linear antenna 4 for transmission.

In the present embodiment, the configuration in which the linear antenna 4 is mounted in the vicinity of the hinge portion 3 provided at the lower case 2 while the surface mounting antenna 5 is mounted in the vicinity of the microphone unit 22 causes only one antenna to be covered by a holder's hand at a time, thereby reducing the deterioration of the antennas characteristics as required.

Further, the configuration in which both the linear antenna 4 and the surface mounting antenna 5 are disposed in the lower case 2 does not affect the relative disposition between those two antennas when the upper case 1 is opened or closed. Thus, in a closed state of the upper case 1, the deterioration of the antennas characteristics as required may be reduced.

Further, the configuration in which the linear antenna 4 and the surface mounting antenna 5 are mounted in such a position as extension lines of them intersect with each other at right angles leads to the reduction of the mutual inductance occurring between those antennas, and thereby reducing the mutual interference between them.

Further, in another configuration where those antennas 4 and 5 are not mounted in such a position that extension lines of them intersect with each other at right angles, the antennas are arranged and mounted in such positions that extension lines of them run crosswise with respect to one another. Such a configuration may reduce the mutual interference between those antennas in a similar manner as described above.

Further, the phase alignment circuit configured to subject a phase of a signal received by those antennas 4 and 5 respectively to an in-phase adjustment may lead to the reduction of the mutual interference between them.

In another configuration, the signals received by the antennas 4 and 5 are connected via the coupling portion 73 to the duplexer 81. At the coupling portion 73, the signal received by the antenna 5 is directly transmitted to the duplexer 81 while the signal received by the linear antenna 4 is transmitted via a pair of lands 74 to the duplexer 81, and thereby to weaken degree of coupling between the signal received by the linear antenna 4 and the duplexer 81 at such pair of lands 74. The configuration leads to the reduction of the mutual interference between them.

In the present embodiment, the aforementioned three configurations to reduce the mutual interference between those antennas are adopted concurrently. Of course, other embodiments may incorporate one or two of those features.

Instead of the foldable mobile phone which is exemplified in the instant embodiment, an alternative embodiment may adopt a straight or nonfoldable mobile phone having linear antenna 4 and surface mounting antenna 5 mounted in the inner side of the casing such that the former is disposed at one of two shorter edge sides of the casing outline and the latter is disposed at the other side thereof. Assuming that a mobile phone shown in FIG. 6 is a straight mobile phone, the linear antenna is mounted in the inner side of the casing and in the vicinity of the receiver unit 11 while the surface mounting antenna 5 is mounted in the inner side of the casing and in the vicinity of the microphone unit 22. The invention permits a mobile terminal and a mobile phone that can reduce the deterioration of the antennas characteristics as required. The instant embodiment may be adapted not only for a mobile phone, but also for such mobile terminal as PDA.

The aforesaid embodiments have been described by taking a folding type cellular phone for instance. When the present invention is implemented in a communication terminal having the same capabilities, the same advantage as the one described herein can be provided.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A mobile communication device comprising:
a plurality of antennas configured to receive signals;
a signal Processing circuit configured to combine and process the signals received from the plurality of antennas;
a phase alignment circuit provided for each of the plurality of antennas and configured to subject a phase of a signal received by each of the plurality of antennas to an in-phase adjustment; and
a coupling portion,
wherein the signals received by the plurality of antennas are connected through the coupling portion to a radio circuit; and
wherein the coupling portion includes a pair of lands and is configured such that the signal received by a first antenna of the plurality of antennas is transmitted directly to the radio circuit and the signal received by a second antenna of the plurality of antennas is transmitted to the radio circuit through the pair of lands so as to weaken a degree of coupling between the signal received by the first antenna and the radio circuit at the pair of lands.

2. A mobile communication device according to claim 1, wherein the signal processing circuit comprises a CDMA signal processing circuit.

3. A mobile communication device according to claim 1, further comprising a housing having two connected cases each including two short side edges which are shorter than two long side edges, wherein a first antenna of the plurality of antennas is connected to one of the short side edges and a second antenna of the plurality of antennas is connected to the other of the short side edges of one of the two cases.

4. A mobile communication device according to claim 3 wherein the first antenna and the second antenna have extension lines that are oriented crosswise with respect to one another.

5. A mobile communication device according to claim 1, further comprising a housing including a first housing portion and a second housing portion rotatably connected by a pivotable connection to permit folding of the first and second housing portions in a folded position.

6. A mobile communication device according to claim 5, wherein the first housing portion includes a first end surface disposed opposite from the pivotable connection and the second housing portion includes a second end surface disposed opposite from the pivotable connection, the first end surface and the second end surface being misaligned with respect to one another in the folded position of the first and second housing portions; and wherein the first end surface extends past the second end surface from the pivotable connection and is not superposed by the second housing portion.

7. A mobile communication device according to claim 6, wherein at least one of the plurality of antennas is disposed near the pivotable connection, and wherein at least another one of the plurality of antennas is disposed near the first end surface.

8. A mobile communication device according to claim 7, wherein the antenna disposed near the first end surface is disposed at a location which is not superposed by the second housing portion in the folded position.

9. A mobile communication device according to claim 7, wherein the antenna disposed near the pivotable connection is movable between a stowed position in one of the first and second housing portions which is an antenna housing and an extended position, the antenna in the stowed position being disposed so as not to extend beyond the pivotable connection with the first and second housing portions in the folded position.

10. A mobile communication device according to claim 9, wherein the antenna disposed near the pivotable connection is jutted out of the antenna housing.

11. A mobile communication device according to claim 9, wherein the antenna disposed near the pivotable connection is held intact after being pulled out of the antenna housing in the extended position.

12. A mobile communication device comprising:
a plurality of antennas configured to receive signals;
a signal processing circuit configured to combine and process the signals received from the plurality of antennas;
a phase alignment circuit provided for each of the plurality of antennas and configured to subject a phase of a signal received by each of the plurality of antennas to an in-phase adjustment; and
a housing having an upper case provided with a receiver portion and a display portion and a lower case provided with a key operation unit and a microphone unit, and a hinge portion foldably connecting the upper case and the lower case at edge portions thereof;
wherein a first antenna of the plurality of antennas is disposed in a vicinity of the hinge and a second antenna of the plurality of antennas is disposed in a vicinity of the microphone unit.

13. A mobile communication device according to claim 12 wherein the first antenna comprises a whip antenna, and an antenna top portion connected through an insulating spacer to a tip end of the whip antenna and including a helical antenna, and wherein the second antenna comprises a surface mounted antenna.

14. A mobile communication device according to claim 12 wherein the first antenna and the second antenna have extension lines that are oriented crosswise with respect to one another.

15. A mobile communication device according to claim 12, further comprising a coupling portion, wherein the signals received by the plurality of antennas are connected through the coupling portion to a radio circuit.

16. A mobile communication device according to claim 15, wherein the coupling portion includes a pair of lands and is configured such that the signal received by a first antenna of the plurality of antennas is transmitted directly to the radio circuit and the signal received by a second antenna of the plurality of antennas is transmitted to the radio circuit through the pair of lands so as to weaken a degree of coupling between the signal received by the first antenna and the radio circuit at the pair of lands.

17. A mobile communication device according to claim 12, wherein the signal processing circuit comprises a CDMA signal processing circuit.

18. A mobile communication device comprising:
a plurality of antennas configured to receive signals;
a CDMA circuit configured to process the signals received from the plurality of antennas;
a phase alignment circuit provided for each of the plurality of antennas and configured to subject a phase of a signal received by each of the plurality of antennas to an in-phase adjustment; and
a coupling portion, wherein the signals received by the plurality of antennas are connected through the coupling portion to a radio circuit, wherein the coupling portion includes a pair of lands and is configured such that the signal received by a first antenna of the plurality of antennas is transmitted directly to the radio circuit and the signal received by a second antenna of the plurality of antennas is transmitted to the radio circuit through the pair of lands so as to weaken a degree of coupling between the signal received by the first antenna and the radio circuit at the pair of lands.

19. A mobile communication device according to claim 18, further comprising a housing including a first housing portion and a second housing portion rotatably connected by a pivotable connection to permit folding of the first and second housing portions in a folded position; wherein at least one of the plurality of antennas is disposed in the first housing portion and is not superposed by the second housing portion in the folded position.

* * * * *